(12) United States Patent
Junger et al.

(10) Patent No.: US 8,595,062 B2
(45) Date of Patent: Nov. 26, 2013

(54) SYSTEMS AND/OR METHODS FOR FRAUD DETECTION IN AWARD POINT PROGRAMS

(75) Inventors: Peter J. Junger, Redmond, WA (US); Brian Cheney, Auburn, WA (US)

(73) Assignee: Nintendo of America Inc., Redmond, WA (US)

( * ) Notice: Subject to any disclaimer, the term of this patent is extended or adjusted under 35 U.S.C. 154(b) by 212 days.

(21) Appl. No.: 12/926,382

(22) Filed: Nov. 15, 2010

(65) Prior Publication Data

US 2012/0123845 A1 May 17, 2012

(51) Int. Cl.
*G06Q 30/00* (2012.01)
(52) U.S. Cl.
USPC .................................. 705/14.26; 705/14.32
(58) Field of Classification Search
USPC .......................................... 705/14.26, 14.32
See application file for complete search history.

(56) References Cited

U.S. PATENT DOCUMENTS

| | | | |
|---|---|---|---|
| 789,106 A | 5/1905 | Seymour | |
| 1,330,368 A | 2/1920 | Boos | |
| 1,393,489 A | 10/1921 | Boos | |
| 1,476,819 A | 12/1923 | Hope | |
| 4,312,037 A | 1/1982 | Yamakita | |
| 4,414,467 A | 11/1983 | Gould et al. | |
| 4,458,802 A | 7/1984 | Maciver et al. | |
| 4,563,739 A | 1/1986 | Gerpheide et al. | |
| 4,598,810 A | 7/1986 | Shore et al. | |
| 4,668,150 A | 5/1987 | Blumberg | |
| 4,734,005 A | 3/1988 | Blumberg | |
| 4,750,119 A | 6/1988 | Cohen et al. | |
| 4,789,054 A | 12/1988 | Shore et al. | |
| 4,792,018 A | 12/1988 | Humble et al. | |
| 4,803,348 A | 2/1989 | Lohrey et al. | |
| 4,812,629 A | 3/1989 | O'Neil et al. | |
| 4,814,592 A | 3/1989 | Bradt et al. | |
| 4,839,505 A | 6/1989 | Bradt et al. | |

(Continued)

FOREIGN PATENT DOCUMENTS

| BR | PI 9813567-8 | 10/2000 |
|---|---|---|
| BR | 0101819-1 | 2/2003 |

(Continued)

OTHER PUBLICATIONS

"Man accused in Lego selling scam", http://www.kptv.com/Global/story.asp?S=4137050&nav=muni156_2, Nov. 18, 2005, 1 page.
"No more scamming Super Mario," Automatic I.D. News, vol. 12, p. 15, Sep. 1996, 3 pages.
"Software Maker Promises Many Happy Returns", Drug Topics, vol. 140, No. 5, pp. 124-128 (Mar. 4, 1996).

(Continued)

*Primary Examiner* — John G Weiss
*Assistant Examiner* — Adam Chornesky
(74) *Attorney, Agent, or Firm* — Nixon & Vanderhye PC

(57) ABSTRACT

Certain exemplary embodiments described herein relate to the field of electronic registration (ER) of purchased items and, more particularly, to improved electronic registration techniques that provide validation and/or verification services for an award points program and/or products having associated award points. Certain exemplary embodiments provide electronic award points management techniques that authenticate item purchases, determine eligibility for inclusion in a manufacturer's or a retailer's award program, help identify and detect potential fraudulent transactions involving award points and/or associated products, etc. Certain exemplary embodiments may allow point information to be printed directly on a case where it is continually visible, which may, in turn, help increase enrollment by increasing visibility of the program, reducing the likelihood of insert cards being lost, etc., while at the same time reducing costs for program implementation on the part of manufacturers, retailers, etc.

25 Claims, 5 Drawing Sheets

(56) References Cited

U.S. PATENT DOCUMENTS

| | | | |
|---|---|---|---|
| 4,858,743 A | 8/1989 | Paraskevakos et al. | |
| 4,866,661 A | 9/1989 | De Prins | |
| 4,871,054 A | 10/1989 | Murray | |
| 4,884,212 A | 11/1989 | Stutsman | |
| 4,893,705 A | 1/1990 | Brown | |
| 4,896,024 A | 1/1990 | Morello et al. | |
| 4,903,815 A | 2/1990 | Hirschfeld et al. | |
| 4,967,906 A | 11/1990 | Morello et al. | |
| 4,984,155 A | 1/1991 | Geier et al. | |
| 4,997,076 A | 3/1991 | Hirschfeld et al. | |
| 5,007,518 A | 4/1991 | Crooks et al. | |
| 5,020,958 A | 6/1991 | Tuttobene | |
| 5,028,766 A | 7/1991 | Shah | |
| 5,042,686 A | 8/1991 | Stucki | |
| 5,128,520 A | 7/1992 | Rando et al. | |
| 5,128,527 A | 7/1992 | Kawai et al. | |
| 5,133,441 A | 7/1992 | Brown | |
| 5,139,384 A | 8/1992 | Tuttobene | |
| 5,143,193 A | 9/1992 | Geraci | |
| 5,159,560 A | 10/1992 | Newell et al. | |
| 5,216,612 A | 6/1993 | Cornett et al. | |
| 5,231,569 A | 7/1993 | Myatt et al. | |
| 5,256,863 A | 10/1993 | Ferguson et al. | |
| 5,257,741 A | 11/1993 | Rode et al. | |
| 5,273,183 A | 12/1993 | Tuttobene | |
| 5,311,424 A | 5/1994 | Mukherjee et al. | |
| 5,367,148 A * | 11/1994 | Storch et al. | 235/375 |
| 5,372,386 A | 12/1994 | Mills | |
| 5,375,240 A | 12/1994 | Grundy | |
| 5,414,252 A | 5/1995 | Shinoda et al. | |
| 5,416,306 A | 5/1995 | Imahata | |
| 5,478,990 A | 12/1995 | Montanari et al. | |
| 5,520,990 A | 5/1996 | Rotermund | |
| 5,521,815 A | 5/1996 | Rose, Jr. | |
| 5,537,314 A | 7/1996 | Kanter | |
| 5,541,394 A | 7/1996 | Kouchi et al. | |
| 5,581,064 A | 12/1996 | Riley et al. | |
| 5,602,377 A | 2/1997 | Beller et al. | |
| 5,671,279 A | 9/1997 | Elgamal | |
| 5,712,989 A | 1/1998 | Johnson et al. | |
| 5,721,832 A | 2/1998 | Westrope et al. | |
| 5,737,726 A | 4/1998 | Cameron et al. | |
| 5,745,036 A | 4/1998 | Clare | |
| 5,799,285 A | 8/1998 | Klingman | |
| 5,804,803 A | 9/1998 | Cragun et al. | |
| 5,857,175 A | 1/1999 | Day et al. | |
| 5,889,270 A | 3/1999 | Van Haagen et al. | |
| 5,890,138 A | 3/1999 | Goidin | |
| 5,895,453 A | 4/1999 | Cook | |
| 5,913,210 A | 6/1999 | Call | |
| 5,918,213 A | 6/1999 | Bernard et al. | |
| 5,918,214 A | 6/1999 | Perkowski | |
| 5,949,335 A | 9/1999 | Maynard | |
| 5,950,173 A | 9/1999 | Perkowski | |
| 5,966,450 A | 10/1999 | Hosford et al. | |
| 5,968,110 A | 10/1999 | Westrope et al. | |
| 5,978,774 A * | 11/1999 | Rogers et al. | 705/24 |
| 5,984,508 A | 11/1999 | Hurley | |
| 6,014,635 A | 1/2000 | Harris et al. | |
| 6,016,480 A | 1/2000 | Houvener et al. | |
| 6,018,719 A * | 1/2000 | Rogers et al. | 705/24 |
| 6,025,780 A | 2/2000 | Bowers et al. | |
| 6,029,139 A | 2/2000 | Cunningham et al. | |
| 6,029,141 A | 2/2000 | Bezos et al. | |
| 6,039,244 A | 3/2000 | Finstrewald | |
| 6,049,778 A * | 4/2000 | Walker et al. | 705/14.14 |
| 6,055,511 A | 4/2000 | Luebbering et al. | |
| 6,064,979 A | 5/2000 | Perkowski | |
| 6,085,167 A | 7/2000 | Iguchi | |
| 6,085,172 A * | 7/2000 | Junger | 705/28 |
| 6,105,001 A | 8/2000 | Masi et al. | |
| 6,115,690 A | 9/2000 | Wong | |
| 6,119,099 A | 9/2000 | Walker et al. | |
| 6,119,164 A | 9/2000 | Basche | |
| 6,125,352 A | 9/2000 | Franklin et al. | |
| 6,131,088 A | 10/2000 | Hill | |
| 6,134,533 A * | 10/2000 | Shell | 705/26.82 |
| 6,148,249 A | 11/2000 | Newman | |
| 6,154,738 A | 11/2000 | Call | |
| 6,219,652 B1 | 4/2001 | Carter et al. | |
| 6,222,914 B1 * | 4/2001 | McMullin | 379/144.01 |
| 6,269,344 B1 | 7/2001 | Junger | |
| 6,317,028 B1 | 11/2001 | Valiulis | |
| 6,463,421 B2 | 10/2002 | Junger | |
| 6,536,659 B1 | 3/2003 | Hauser | |
| 6,542,933 B1 | 4/2003 | Durst et al. | |
| 6,550,685 B1 | 4/2003 | Kindberg | |
| 6,554,187 B2 | 4/2003 | Otto | |
| 6,606,608 B1 | 8/2003 | Bezos | |
| 6,697,812 B1 | 2/2004 | Martin | |
| 6,746,053 B1 | 6/2004 | Afzali-Ardakani et al. | |
| 6,757,663 B1 | 6/2004 | Rogers et al. | |
| 6,834,268 B2 | 12/2004 | Junger | |
| 6,933,848 B1 | 8/2005 | Stewart et al. | |
| 6,947,941 B1 | 9/2005 | Koon | |
| 6,965,866 B2 | 11/2005 | Klein | |
| 7,000,834 B2 | 2/2006 | Hind et al. | |
| 7,016,863 B1 * | 3/2006 | Kamakura et al. | 705/14.32 |
| 7,117,227 B2 | 10/2006 | Call | |
| 7,118,478 B2 | 10/2006 | Fayter et al. | |
| 7,143,055 B1 | 11/2006 | Perkowski | |
| 7,162,440 B2 | 1/2007 | Koons | |
| 7,363,265 B2 * | 4/2008 | Horgan | 705/35 |
| 7,376,572 B2 | 5/2008 | Siegel | |
| 7,379,899 B2 | 5/2008 | Junger | |
| 7,415,617 B2 * | 8/2008 | Ginter et al. | 713/189 |
| 7,455,230 B2 * | 11/2008 | Junger et al. | 235/462.07 |
| 7,580,860 B2 | 8/2009 | Junger | |
| 7,693,731 B1 | 4/2010 | Weber et al. | |
| 7,729,923 B2 | 6/2010 | O'Connor | |
| 7,797,164 B2 | 9/2010 | Junger et al. | |
| 7,840,439 B2 | 11/2010 | O'Connor | |
| 7,850,081 B2 | 12/2010 | Swan et al. | |
| 7,890,373 B2 | 2/2011 | Junger | |
| 7,917,386 B2 * | 3/2011 | Christensen | 705/14.1 |
| 8,204,787 B2 * | 6/2012 | Rogers et al. | 705/24 |
| 2002/0010627 A1 | 1/2002 | Lerat | |
| 2002/0032612 A1 | 3/2002 | Williams et al. | |
| 2002/0077890 A1 * | 6/2002 | LaPointe et al. | 705/14 |
| 2002/0116274 A1 | 8/2002 | Hind et al. | |
| 2002/0133425 A1 | 9/2002 | Pederson et al. | |
| 2002/0143671 A1 | 10/2002 | Afzali-Ardakani et al. | |
| 2002/0169671 A1 * | 11/2002 | Junger | 705/14 |
| 2003/0050891 A1 | 3/2003 | Cohen | |
| 2003/0094494 A1 | 5/2003 | Blanford et al. | |
| 2003/0126034 A1 | 7/2003 | Cheney et al. | |
| 2003/0141358 A1 | 7/2003 | Hudson et al. | |
| 2004/0006514 A1 | 1/2004 | Rogers | |
| 2004/0054900 A1 | 3/2004 | He | |
| 2004/0153344 A1 | 8/2004 | Bui et al. | |
| 2004/0172260 A1 * | 9/2004 | Junger et al. | 705/1 |
| 2004/0195411 A1 | 10/2004 | Lapstun et al. | |
| 2004/0249710 A1 * | 12/2004 | Smith et al. | 705/14 |
| 2005/0097054 A1 | 5/2005 | Dillon | |
| 2005/0100144 A1 | 5/2005 | O'Connor | |
| 2005/0137882 A1 | 6/2005 | Cameron et al. | |
| 2006/0010033 A1 * | 1/2006 | Thomas | 705/14 |
| 2006/0167744 A1 * | 7/2006 | Yoo | 705/14 |
| 2006/0175401 A1 | 8/2006 | Roberts | |
| 2006/0237534 A1 * | 10/2006 | Junger et al. | 235/383 |
| 2007/0100761 A1 * | 5/2007 | Dillon | 705/59 |
| 2007/0185788 A1 * | 8/2007 | Dillon | 705/28 |
| 2008/0008348 A1 | 1/2008 | Metois | |
| 2008/0052184 A1 * | 2/2008 | Junger et al. | 705/26 |
| 2008/0059226 A1 | 3/2008 | Melker | |
| 2008/0114646 A1 * | 5/2008 | Ash | 705/14 |
| 2008/0262948 A1 | 10/2008 | Grady et al. | |
| 2009/0089111 A1 * | 4/2009 | Walker et al. | 705/7 |
| 2009/0150170 A1 * | 6/2009 | Junger et al. | 705/1 |
| 2009/0271265 A1 * | 10/2009 | Lay et al. | 705/14.38 |
| 2009/0281935 A1 | 11/2009 | Junger | |
| 2010/0049600 A1 * | 2/2010 | Steinman et al. | 705/14.14 |
| 2010/0095357 A1 * | 4/2010 | Willis et al. | 726/6 |
| 2010/0174993 A1 * | 7/2010 | Pennington et al. | 715/738 |

(56) References Cited

U.S. PATENT DOCUMENTS

| | | | | |
|---|---|---|---|---|
| 2010/0185505 | A1* | 7/2010 | Sprogoe et al. | 705/14.27 |
| 2010/0185533 | A1 | 7/2010 | O'Connor | |
| 2010/0235290 | A1 | 9/2010 | Junger et al. | |
| 2010/0257486 | A1 | 10/2010 | Smith | |
| 2010/0299196 | A1* | 11/2010 | Graves et al. | 705/14.34 |
| 2010/0325020 | A1 | 12/2010 | Junger et al. | |
| 2011/0016008 | A1 | 1/2011 | Maraz et al. | |
| 2011/0029397 | A1 | 2/2011 | Junger | |
| 2011/0066514 | A1* | 3/2011 | Maraz | 705/17 |
| 2011/0156907 | A1* | 6/2011 | Nagai | 340/572.1 |
| 2012/0114116 | A1* | 5/2012 | Sulaiman et al. | 380/28 |
| 2012/0123845 | A1* | 5/2012 | Junger et al. | 705/14.26 |
| 2012/0271689 | A1* | 10/2012 | Etheredge et al. | 705/14.13 |

FOREIGN PATENT DOCUMENTS

| | | |
|---|---|---|
| BR | PI 0503016-1 | 10/2005 |
| BR | PI 0505846-5 | 9/2007 |
| CA | 2404814 | 9/2002 |
| CN | 1177408 | 3/1998 |
| CN | 1289972 | 4/2001 |
| CN | 101068731 | 11/2007 |
| CN | 101089871 | 12/2007 |
| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| EP | 1028386 | 8/2000 |
| EP | 1841195 | 11/2000 |
| EP | 1195704 | 4/2002 |
| EP | 1246109 | 10/2002 |
| EP | 1571541 | 3/2005 |
| EP | 1667018 | 10/2005 |
| EP | 2036015 | 12/2007 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| GT | 200000127 | 10/2000 |
| GT | 200000061 | 11/2000 |
| GT | 200300100 | 3/2006 |
| GT | 200200141 | 7/2007 |
| IN | 1072/CHENP/2003 | 7/2005 |
| IN | 1763/CHENP/2003 | 3/2007 |
| IN | 2137/CHENP/2005 | 7/2007 |
| IN | 538/MUM/2008 | 4/2008 |
| IN | 8258/DELNP/2007 | 4/2008 |
| IN | 8266/DELNP/2007 | 7/2008 |
| IN | 303/KOLNP/2008 | 12/2008 |
| IN | 53/KOL/2008 | 4/2009 |
| IN | 1421/KOLNP/2009 | 6/2009 |
| JP | 02-139698 | 5/1990 |
| JP | 04-347793 | 12/1992 |
| JP | 05-178422 | 7/1993 |
| JP | 05-342482 | 12/1993 |
| JP | 08-124033 | 5/1996 |
| JP | 10-188141 | 7/1998 |
| JP | 10-340301 | 12/1998 |
| JP | 11-066176 | 3/1999 |
| JP | 11-143954 | 5/1999 |
| JP | 2000-123078 | 4/2000 |
| JP | 2002-279090 | 9/2002 |
| JP | 2002-133080 | 10/2002 |
| JP | 2003-316871 | 11/2003 |
| JP | 2005-141374 | 6/2005 |
| JP | 2005-234981 | 9/2005 |
| JP | 2007-226516 | 9/2007 |
| JP | 2007-257561 | 10/2007 |
| JP | 2008-197768 | 8/2008 |
| JP | 2009-032171 | 2/2009 |
| KR | 2002-0014150 | 2/2002 |
| KR | 2004-0013343 | 2/2004 |
| MX | 218248 | 3/1998 |
| MX | PA/a/2000/002497 | 3/1999 |
| MX | 221246 | 7/1999 |
| MX | PA/a/2002/000636 | 11/2001 |
| MX | MX/a/2007/014520 | 11/2006 |
| SV | 1991000023 | 1/1991 |
| SV | 1996000019 | 1/1996 |
| SV | 1998000129 | 1/1998 |
| SV | 2000000045 | 1/2000 |
| SV | 2000000145 | 1/2000 |
| SV | 2003001513 | 1/2003 |
| SV | 2003001514 | 1/2003 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Jan. 6, 2005 Blog (Message 4 of 17) about Schuman article "Bar-Code Scam at Wal-Mart: A Matter of Priorities".

Jan. 13, 2005 Blog (Message 14 of 17) about Schuman article "Bar-Code Scam at Wal-Mart: A Matter of Priorities".

1992 Nintendo Product Returns Policy.

1994 Nintendo Product Returns Policies and Procedures.

1995 Nintendo Product Returns Policies and Procedures.

1996 Nintendo Product Returns Policies and Procedures, 4 pages.

Amazon.com Returns Policy, Our Return Policy is Simple, Jun. 20, 2000, Amazon.com, www.amazon.com/exec/obidos/subst/help/returns-policy.html, pp. 1-2.

Automotive News, "Reynolds, ADP differ on superhighway progress", Crain Communications, Inc., Apr. 11, 1994, 3 pages.

Birnbaum, Henry, General Information Manual: IBM Circulation Control at Brooklyn College Library, 29pp. (ON 001822-ON 001850.

Brewin et al., "Follow That Package!", Computer World, vol. 35, No. 12, Mar. 19, 2001, 4 pages.

Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.

Business Wire, "DataTrend receives award from AT&T Global Information Solutions", Business Wire, Inc., Nov. 7, 1995, 2 pages.

Business Wire, "Multimillion-dollar Health-care Products", Business Wire, Inc., Dec. 15, 1993, 2 pages.

CollegeTermPapers web page printout, "History of Fed Ex", www.collegetermpaper...rmPapers/Aviation/history_of_fed_ex.html (Aug. 24, 2001), 7 pages.

Collins, David Jarrett and Nancy Nasuti Whipple, Using Bar Code: Why It's Taking Over, Second Edition (ON 003696-ON 004031).

Computer Reseller News, "Case Study; Tapping The Channel's 'Best In Class'", CMP Publications, Inc., Jan. 30, 1995, 2 pages.

Deposition of Peter J. Junger, vol. 1 & 2 (Nov. 8-9, 2001) and Exhibits 1-4 & 8-19.

Deposition of Philip M. Rogers (Nov. 7, 2001) and Exhibits 1-19.

Dilger, "The other direction," Manufacturing Systems, v. 15, n. 10, pp. 12-13, Oct. 1997, 2 pages.

Direct Return 2000, Software Overview, http://www.directreturn.com/software_overview.htm, Copyright © 2000 Pharmacy Software Solutions, Inc.

Discount Store News, "New Policy System can Pare Suspect Returns, Cut Losses", Discount Store News, Lebhar-Friedman Inc., Jan. 1, 1996, 2 pages.

Dowlin, Kenneth E., "MAGGIE III: The Prototypical Library System", Library Hi Tech, Issue 16, vol. 4, No. 4, Winter 1986, pp. 7-15 (ON 001960-ON 001970).

Dranov, Paula, Automated Library Circulation Systems, 1977-78, pp. 24-47 (ON 001905-ON 001929).

Dreamcom web page printout, www.dreamcomdirect.com/RMA.htm (May 25, 1997).

Emigh, Jacqueline, "Item-Level RFID Is Years Away for Retailers", eWeek, Jan. 5, 2005.

(56) References Cited

OTHER PUBLICATIONS

Fox Appliance Return Parts Policy, Aug. 5, 2003, www.foxmacon. com, online, pp. 1-3.
Georgianis, Maria, "Computer City Moves to Consolidate Returns", Computer Retail Systems, vol. 6, No. 125, Jan. 22, 1998, 2 pages.
Grace, "ABCD Looks to Adopt EDI Transaction Sets", Computer Reseller News, CMP Publications, Inc., Jun. 28, 1993, 2 pages.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Heller, "High cost of returns prompts industry cooperation," Discount Store News, Oct. 1998, 3 pages.
Hoadley, Irene Braden and A. Robert Thorson, An Automated On-Line Circulation System: Evaluation, Development, Use, 1973, 19 pp. (ON 001930-On 001948).
Hughes Network Systems, LLC, "HughesNet Terms & Conditions", http://www.nationwidesatellite.com/HughesNet/service/HughesNet_terms.asp, available online Sep. 2, 2008.
IBM Systems Journal, vol. 14, No. 1, 1975, pp. 1-101.
Information Disclosure Statement filed in U.S. Appl. No. 08/725,259 on Oct. 5, 1998.
Information Disclosure Statement filed in U.S. Appl. No. 09/065,552 on Jul. 19, 1999.
Information Disclosure Statement filed in U.S. Appl. No. 09/362,187 on Oct. 26, 2001.
Information Disclosure Statement filed in U.S. Appl. No. 09/494,540 on Jan. 31, 2000.
Information Disclosure Statement filed in U.S. Appl. No. 09/509,021 on Oct. 26, 2001.
Information Disclosure Statement filed in U.S. Appl. No. 09/809,072 on Oct. 26, 2001.
Jiji Press Ticker Service, "JCCI Issues Booklet to Explain Distribution", JiJi Press Ltd., Jul. 20, 1989, 1 page.
Jiji Press Ticker Service, "MITI Working Out Business Practice Guidelines", JiJi Press Ltd., Apr. 20, 1990, 1 page.
Joachim, "FedEx Delivers On CEO's IT Vision", InternetWeek, Oct. 25, 1999, 4 pages.
LaPlante, "Rugby Darby; From proprietary host to a distributed LAN-based architecture in 2 years", InfoWorld, InfoWorld Media Group, Nov. 15, 1993, 4 pages.
Leyden, "Burgled mum finds stolen iPod on eBay," The Register, May 17, 2005, 1 page.
Longwell, "Robec Links Its 18 Sales Facilities Via Newly Adopted NetWare System", Computer Reseller News, Sep. 6, 1993.
Longwell, "Western Digital Wins—Price/performance gives driver maker victory margin", Computer Reseller News, CMP Publications, Inc., Jun. 28, 1993, 3 pages.
Margulis, "Reclaim: an efficient way to handle damaged products", U.S. Distribution Journal, BMT Publications Inc., Mar. 15, 1992, 7 pages.
Matthews, Joseph R., "Graphical User Interfaces GUI in Library Products", Library Technology Reports, vol. 32, No. 1, Jan. 1996, p. 53 (ON 001972-ON 001976).
Meyer, James, "NOTIS: The System and Its Features", Library Hi Tech, Issue 10, vol. 3, No. 2, 1985, pp. 81-89 (ON 001949-ON 001959).
Narda News, "Retailing in Cyberspace", Apr. 1995, pp. 21-22.
PR Newswire, "CompuServe Introduces Electronic Product Registration Software", PR Newswire Association, Inc., Mar. 10, 1994, 2 pages.
PR Newswire, "Escada Offers A Garden Variety For Spring", PR Newswire Association, Inc., Mar. 10, 1994, 2 pages.

Quinn, "Why Wang took the third-party route", Information Access Company, a Thomson Corporation Company, ASAP Reed Publishing USA, vol. 30, No. 2, p. 30, Feb. 1991.
Rigney, "User Migrates to Windows NT", InternetWeek, CMP Publications, Inc., Jan. 10, 1994, 2 pages.
Rogers et al., "Going Backwards: Reverse Logistics Trends and Practices", Reverse Logistics Executive Council, 1998 (entire book).
Rosenbloom, "Midnight Express", Inc., Jul. 2001, 4 pages.
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Microcomputers and Mainframes: An Industry Report, part 1", Library Techology Reports, vol. 33, No. 3, May 1997, p. 277 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Scala, Betsy Video Business, "Distributors seek 30-day returns", v 13, n 3, p. I + Jan. 22, 1993.
Scala, Betsy Video Business, "Distributors seek 30-day returns", v 15, n 39, p. I + Oct. 6, 1995.
Schuman, Evan,"Bar-Code Scam at Wal-Mart: A Matter of Priorities", eWeek, Jan. 5, 2005.
Schuman, Evan,"Wal-Mart Stung in $1.5 Million Bar-Code Scam", eWeek, Jan. 5, 2005.
Sigafoos et al., "Absolutely Positively Overnight!: The Unofficial Corporate History of Federal Express", St. Luke Press, 1988, pp. 1-22.
Sleeper, "FedEx Pushes The Right Buttons to Remain No. 1 In Fast Shipping", Investor's Business Daily, May 25, 2001, 2 pages.
Synchronics® User Manual: Inventory Plus, Version 6.5, Apr. 1993 (ON 004464-ON 005116).
Synchronics® User Manual: Point of Sale, Version 6.5, Apr. 1993 (ON 005117-ON 005892).
Witt, "How To Master The Art of Returns: Automation Is The Key", Material Handling Engineering, Jun. 1994, pp. 58-60.
Witt et al., "Distribution: a differentiator in 2000", Material Handling Engineering, Penton Publishing Inc., Oct. 1995, 15 pages.
International Preliminary Report on Patentability and Written Opinion issued in PCT/US2011/060734 on May 30, 2013.
Consumer Electronics, Consumer Electronics Personals, vol. 35, No. 6, p. 18., Copyright 1995 Warren Publishing, Inc.
Cooper, Michael D., Design of Library Automation Systems, pp. 83-109, (ON 001859-ON 001873), (at least as early as Oct. 2001).
Corbin, John, Developing Computer-Based Library Systems, pp. 144-149, (ON 001874-ON 001877); Copyright 1981.
DataPhase, Inc. Automated Circulation System, 43 pp., (ON 001878-ON 001904), (at least as early as May 2008).
Federal Express Information Packet, 56 pages (incl. cover and table of contents), (at least as early as 2001).
Grosch, Audrey N., Distributed Computing and the Electronic Library: Micros to Superminis, pp. 78-79, (ON 002144-ON 002146); Copyright 1985.
Nintendo Point of Purchase Mail-In Card, (at least as early as Dec. 1992).
Reynolds, Dennis, Library Automation: Issues and Applications, pp. 42-49 and pp. 146-149, (ON 002147-ON 002153); Copyright 1985.
Salmon, Stephen R., Library Automation Systems, p. 239, (ON 002154-ON 002155); Copyright 1975.
Salton, Gerard, Dynamic Information and Library Processing, pp. 62-69, (ON 002139-ON 002143); Copyright 1975.
Synchronics Software Product Information guide, 95 pages; Copyright 1992.
White, Howard S., Library Technology Reports, Mar. 1982, vol. 18, No. 2, pp. 178-184 (ON 001851-ON 001858).

\* cited by examiner

SYSTEMS AND/OR METHODS FOR FRAUD DETECTION IN AWARD POINT PROGRAMS

TECHNICAL FIELD

The exemplary embodiments described herein relate to the field of electronic registration (ER) of purchased items and, more particularly, to improved electronic registration techniques that provide validation and/or verification services for an award points program and/or products having associated award points. Certain exemplary embodiments provide electronic award points management techniques that authenticate item purchases, determine eligibility for inclusion in a manufacturer's or a retailer's award program, help identify and detect potential fraudulent transactions involving award points and/or associated products, etc.

BACKGROUND AND SUMMARY

Electronic registration (ER) of product transactions recently has become available for the purpose of reducing unauthorized returns of purchased products and/or unauthorized warranty repair on purchased products. Electronic product registrations systems provided for this purpose are disclosed in, for example, U.S. Pat. Nos. 5,978,774; 6,018,719; and 6,085,172, the disclosures of which are all incorporated by reference herein in their entirety. The electronic registration system relies on the use of a unique identifier, such as a serial number linked to a UPC (and/or RFID) or its equivalent, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria under which the product was originally sold. Such electronic systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the ER system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturers and/or retailers which enables the system to make an accurate determination with respect to whether or not a product actually qualifies for return (or warranty/replacement) based on the appropriate criteria and at the time the product is actually presented for return. Such ER systems have greatly reduced improper and fraudulent returns and warranty claims.

While such ER systems have proven to be very useful in their current forms, additional improvements in the system are still desired to make such ER systems more flexible in operation in order to benefit customers, retailers, and manufacturers. For example, problems may arise in situations where frequent buyer award points systems and/or gift cards are provided. There are different variations of frequent buyer award points systems but, in general, such systems enable a customer to redeem points for monetary value, product offerings, or the like. In some respects, these frequent buyer award points systems are "cash equivalents," in the sense that they can be used to "purchase" other products. Points may be purchased separately, "earned" by purchasing a product having a certain number of points, etc. Frequent buyer award programs often require participating customers to register (e.g., by providing personal information like name, address, telephone number, etc.) and to "activate" or "cash-in" their points by using an activation code (e.g., using a telephone dial-in system, the Internet, or the like).

Unfortunately, product insert cards (which may contain activation codes for the purpose of redeeming award points) present an added cost to the manufacturer, produce additional waste, are often lost before they can be redeemed, can be removed before purchase or obtained from products that are stolen or shoplifted, etc. To help thwart these and/or other potentially fraudulent activities, retailers secure products behind locked display cases, attach source tags, design bomb-proof packaging at great dismay to the consumer and the environment, and take other costly measures.

Thus, it will be appreciated that there is a need in the art for improved ER techniques that help facilitate frequent buyer award point programs.

One aspect of certain exemplary embodiments relates to electronic award points management techniques that authenticate item purchases, determine eligibility for inclusion in a manufacturer's or a retailer's award program, help identify and detect potential fraudulent transactions involving award points and/or associated products, etc.

Another aspect of certain exemplary embodiments relates to reducing (and sometimes even completely eliminating) the need for a wasteful insert card, e.g., containing reward points information. Certain exemplary embodiments may accomplish this by relying on a product's serial number, optionally together with instructions (which may be printed on the product packaging, in the product instruction manual, or elsewhere).

Another aspect of certain exemplary embodiments relates to activating cards when sold through an authorized retailer's point-of-sale (POS) system that is tied to a registration module of the ER system. For instance, a rewards system may remotely activate a card under the instruction of an ER system.

Still another aspect of certain exemplary embodiments relates to providing anti-fraud security measures for unregistered points cards.

According to certain exemplary embodiments, a method of detecting potentially fraudulent transactions is provided. An electronic registration (ER) system having an ER database of entries for sold items is provided, with each said entry including a unique identifier of a corresponding sold item, and with each said item having reward points associated therewith. The reward points are redeemable in connection with a rewards program administered at least in part by a rewards program system. When an item is presented for return or refund at a location, the ER system is used to: query the ER database to locate a matching entry, and determine whether the item presented for return or refund has been registered with the rewards program system and whether reward points associated with the item presented for return or refund have been credited to a member and/or redeemed by the member. When the item presented for return or refund has not been registered with the rewards program system and the reward points associated with the item presented for return or refund have not been credited to the member, a signal is sent to the location authorizing the return or refund subject to any return/refund policies of the location. When the item presented for return or refund has been registered with the rewards program system and the reward points associated with the item presented for return or refund have been credited to the member, a signal is sent to the location authorizing the return or refund subject to any return/refund policies of the location, and authorizing the debiting of a corresponding number of reward points from the member. Alternatively or in addition, when the item presented for return or refund has been registered with the rewards program system, the reward points associated with the item presented for return or refund have been credited to the member, and the reward points have been redeemed, a signal is sent to the location denying the return or refund.

According to certain exemplary embodiments, a method of detecting potentially fraudulent transactions is provided. An electronic registration (ER) system having an ER database of entries for sold items is provided, with each said entry including item information including at least a unique identifier of a corresponding sold item, and with each said item having reward points associated therewith. The reward points are redeemable in connection with a rewards program administered at least in part by a rewards program system. When an item is being registered with the rewards program system by a member of the rewards program, it is determined whether information for the item being registered exists in the ER database. When the ER database does not include information for the item being registered, the ER database is updated so as to include an entry for the item being registered and authorization is given to award reward points associated with the item to the member registering the item. The entry includes an anonymous member identifier. When the ER database includes information for the item being registered: item information entered by the member who previously registered the product and item information entered by the member attempting to register the product are examined to identify a suspected fraudster, and the anonymous member identifier of the suspected fraudster is sent to the rewards program system providing for potential follow-up by rewards program personnel.

According to certain exemplary embodiments, an electronic registration (ER) system is provided. An ER database includes a plurality of entries for sold items, with each said entry including a unique identifier of a corresponding sold item, and with each said item having reward points associated therewith. The reward points are redeemable in connection with a rewards program administered at least in part by a rewards program system. A processor is configured to execute instructions for querying the ER database. The processor also is configured to search the ER database when an item is presented for return or refund at a location to (a) locate a matching entry, and (b) determine whether the item presented for return or refund has been registered with the rewards program system and whether reward points associated with the item presented for return or refund have been credited to a member and/or redeemed by the member. The processor is further configured to generate and send a signal to the location authorizing the return or refund subject to any return/refund policies of the location when the item presented for return or refund has not been registered with the rewards program system and the reward points associated with the item presented for return or refund have not been credited to the member. The processor is further configured to generate and send a signal to the location authorizing the return or refund subject to any return/refund policies of the location when the item presented for return or refund has been registered with the rewards program system and the reward points associated with the item presented for return or refund have been credited to the member, and further authorize the debiting of a corresponding number of reward points from the member (e.g., by the rewards program system). The processor is further configured to generate and send a signal to the location denying the return or refund when the item presented for return or refund has been registered with the rewards program system, the reward points associated with the item presented for return or refund have been credited to the member, and the reward points have been redeemed. The item is one of either a rewards point card, or a physical product having an associated number of rewards points.

According to certain exemplary embodiments, an electronic registration (ER) system is provided. An ER database includes entries for sold items, with each said entry including item information including at least a unique identifier of a corresponding sold item, and with each said item having reward points associated therewith. The reward points are redeemable in connection with a rewards program administered at least in part by a rewards program system. A processor is configured to determine whether information for the item being registered exists in the ER database when an item is being registered with the rewards program system by a member of the rewards program. The ER database is updatable when the processor indicates that the ER database does not include information for the item being registered so as to include an entry for the item being registered and wherein the processor is configured to instruct the rewards program system to award reward points associated with the item to the member registering the item, with the entry including an anonymous member identifier. The processor is further configured to examine item information entered by the member who previously registered the product and item information entered by a member attempting to register the product to identify a suspected fraudster, and send the anonymous member identifier of the suspected fraudster to the rewards program system providing for potential follow-up by rewards program personnel. The item is one of either a rewards point card, or a physical product having an associated number of rewards points.

Certain exemplary embodiments may be configured to generate instructions or messages (e.g., via a processor) that are executable by systems to cause particular actions (e.g., to perform additional checks, flag items as suspect, flag members as fraudsters, etc.). Such instructions or messages may be communicated among and/or between systems using respective processors and/or network connections.

It will be appreciated that these aspects and embodiments may be combined in various combinations and sub-combinations to achieve yet further exemplary embodiments. Also, it will be appreciated that the exemplary embodiments herein may be implemented as any suitable combination of programmed logic circuitry including, for example, hardware, software, firmware, etc.

BRIEF DESCRIPTION OF THE DRAWINGS

These and other features and advantages will be better and more completely understood by referring to the following detailed of exemplary illustrative non-limiting implementations in conjunction with the drawings, of which.

DETAILED DESCRIPTION

Figure 1:
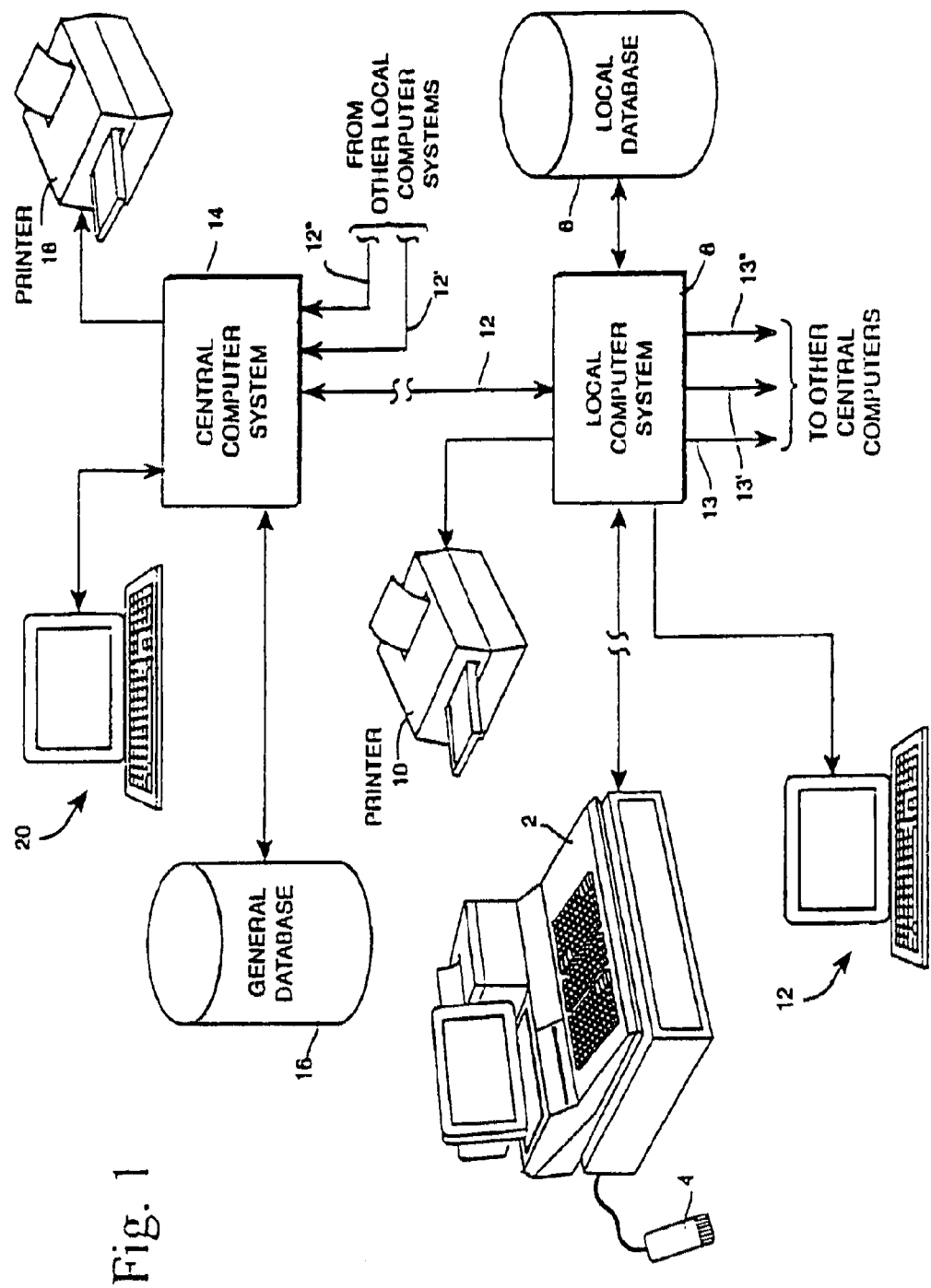
FIG. 1 is a schematic block diagram illustrating an example of an overall electronic product registration (ER) system that may be used in accordance with an exemplary embodiment.

An example of one type of electronic product registration (ER) system that may be used in connection with certain exemplary embodiments is illustrated in FIG. 1. Briefly, this example system includes a point of sale register 2 and an associated bar code scanner 4. The register 2 is connected with a local computer system 6 in any suitable manner. In certain situations (e.g., single store retailers), it may be advantageous to have the local computer system 6 located in proximity to the register 2. For large chain stores, however, it may be advantageous to situate the local retailer computer 6 at a central location with links to the registers 2 at individual stores. The particular arrangement will depend on the preferences and circumstances of the specific retailer and may vary in accordance therewith.

The local retailer computer system includes an associated local database 8 for storing registration information. Additionally, a local printer 10 and an operator terminal 11 may be provided. The operator terminal may be used, for example, by a store clerk upon return of merchandise to locate pertinent sales information in the local database 8. The printer 10 may be used to produce hard copies of, for example, end-of-day sales reports and/or the like.

In the exemplary embodiment, a communication channel 12 is provided between the retailer computer system 6 and a central computer system 14. The central registration computer system may, for example, be an independent registration center computer system which electronically registers product transactions for a number of different retailers. In other words, the central computer system may be operated by a third-party service provider.

A general registration database 16 is associated with the central registration computer system 14 for storing transaction information from a plurality of retailer computer systems 6. Additionally, a printer 18 and an operator terminal 20 may be included with the central registration computer system 14. As discussed below in greater detail, the central registration computer system may maintain a number of data files pertaining to individual retailers, manufactures and the like. These data files include information applicable to the particular individual retailer, distributor, manufacturer or the like and are preferably maintained by that particular individual or entity. For example, a data file may contain specific return/warranty policy information applicable to that particular individual or entity.

It should be appreciated that the central computer system 14 is preferably intended to handle product registrations for a number of different manufacturers and/or other vendors. Accordingly, the general registration database may employ a structure wherein the product registrations for each participating vendor are maintained in separate areas. Alternatively, separate databases may be employed for each participating vendor. Of course, other data structures may be employed so long as the registration center is able to properly keep track of the product transaction information and particular return and/or warranty policies associated with each transaction.

As illustrated in FIG. 1, the central registration computer system 14 may have a number of additional communications links 12', 12", etc. for receiving information from other local computer systems. Thus, for example, a registration center may receive information from a number of different retailers. Additionally, the local computer system 6 may include a number of additional communication channels 13, 13', 13", etc. for connecting with other central computer systems. Accordingly, an individual retailer can electronically register products with a number of different registration databases, if desired. Furthermore, a number of communication channels 15, 15', 15", etc. can be provided for communications between the central registration computer system 14 and individual manufacturer computer systems and computer systems of third party service providers, law enforcement agencies and/or the like. Of course, a general access channel such as an Internet connection may also be made available for authorized access to the central computer system 14.

The electronic registration process begins when a customer brings merchandise to the register 2 for check-out. The sales clerk enters the SKU number which identifies the type of product involved in the transaction (e.g., Super Nintendo Entertainment System, Nintendo Game Boy, Nintendo N64, etc.) by, for example, scanning a UPC product code included on the product packaging. Of course, key entry or another technique for entering the SKU number may be used. Electronic registration might not be necessary for a substantial number of small commodity products (e.g., batteries, candy, diapers, etc.) that are commonly sold by retailers. Accordingly, a check may be made, based on the type of product as identified by the UPC code, to determine whether this is a product for which electronic registration is desired. If so, the store associate is prompted to enter the serial number of the individual item.

The serial number may be entered, for example, by scanning a serial number printed on the packaging. Alternatively, the serial number as it appears on the product may be scanned through a window in the packaging. This alternative ensures that the individual product is identified even if it is mispackaged. Also, repackaging of returned merchandise would be simplified. Other techniques, such as key entry, may also be used. Because the serial number is unique to each individual product, it acts as individual production identification information.

Once the serial number is entered, a check may be made to ensure that the serial number is valid. If not, the store associate is again prompted to enter the serial number. This is repeated until a valid serial number is obtained. Once the serial number is verified, a local database may be updated with the serial number information and any other necessary or desired information. At minimum, however, the local database should include an indication of the date on which the transaction took place. Other information might include the price paid, the store associate responsible for the sale, and the like.

The serial number of the individual product is preferable printed as part of a written customer transaction receipt. The serial number may be printed adjacent the description and SKU number of the registered product. Thus, it will be a simple matter to correlate serial numbers with associated products, particularly when several registered products appear on a single customer sales receipt. Of course, additional information may be printed as well.

The date of the transaction will typically be printed at either the beginning or the end of the sales receipt, but may appear anywhere on the receipt. After the serial number is printed, a check is made to determine whether sales are complete. Ordinarily, this will be based on the store associate hitting a TOTAL button on the cash register. Thereafter, the central registration computer system 14 is contacted and the general registration database 16 is updated with the transaction information.

Inasmuch as ER systems are known, further specific details regarding ER systems themselves will not be provided herein except as needed for a complete understanding of the invention. As seen from the above description of an ER system, original policies are defined for products when they are first sent to the retailer by the vendor. The ER system preferably includes the policies of both the vendor and the retailer and enables the policies of both parties to be easily and conveniently enforced.

Figure 2:
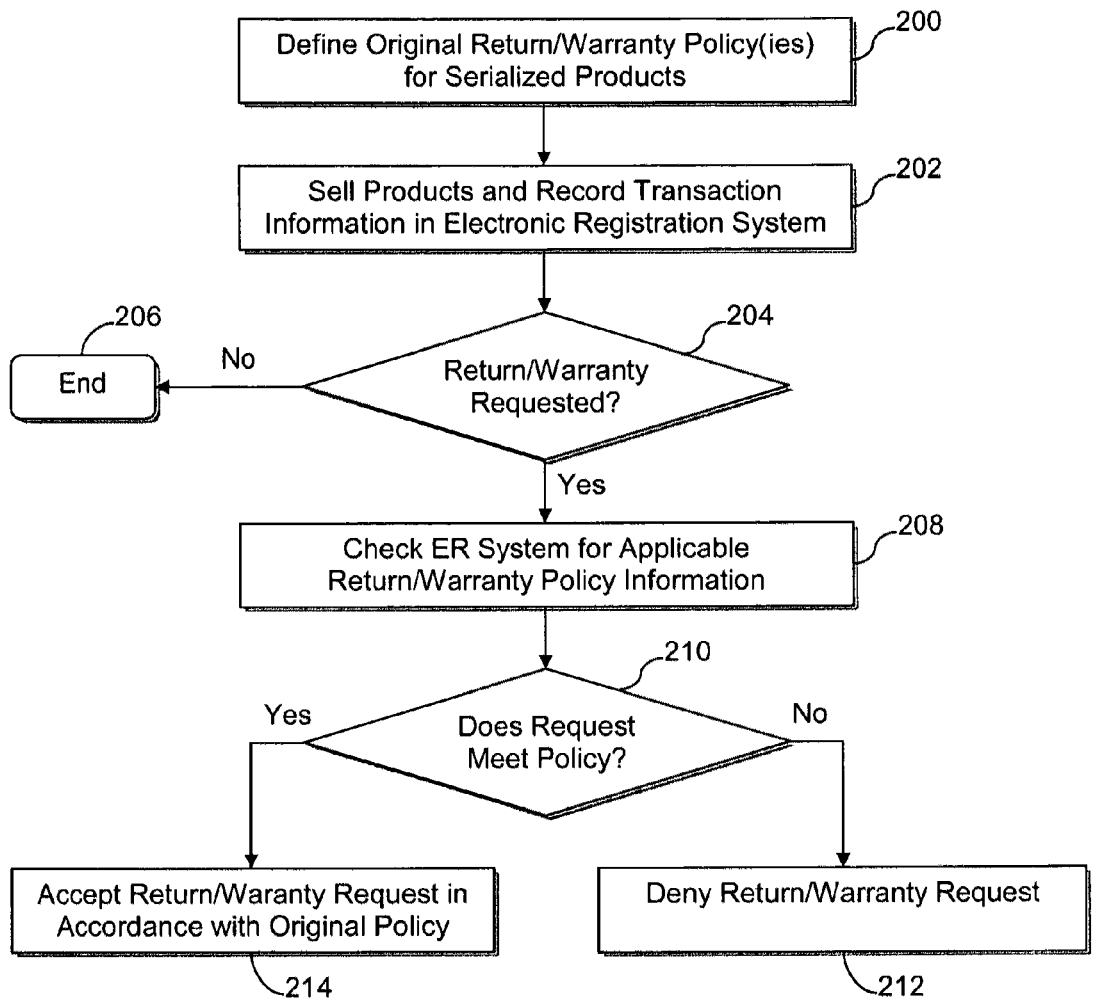
FIG. 2 is a high level flow chart of some of the main steps performed in accordance with prior electronic product registration (ER) systems.

FIG. 2 shows the main steps performed in connection with conventional ER systems. As shown in FIG. 2, the return/warranty policy or policies are defined for serialized products and entered into the ER system (step 200). The ER system uses the policies and the sales transaction information, as well as the date on which a return is requested, to determine if the product qualifies for return when presented for return. Thus, when the products are sold, the sales transaction is recorded in the ER database (step 202). If the consumer is satisfied with the product, then the process ends (step 206). On the other hand, if a return is requested (step 204), the ER system is accessed to obtain the return qualification information for the specific product being presented for return (step 208). In accordance with conventional ER systems, the return request is handled based on the return qualification information provided by the ER system based on the original policies under which the product was originally sold. Thus, based on the return qualification information provided by the ER system, a determination is made as to whether or not the product qualifies for return/warranty repair or the like (step 210). If the product does qualify for the action requested, the request can be honored by the retailer and the transaction can be completed (step 214). On the other hand, if the ER system indicates that the product does not qualify for the requested action, the customer is typically denied the return or warranty repair (step 212). Of course, the store employee could decide, for some reason, to ignore the ER information and accept the product anyway.

As indicated above, it would be desirable to provide improved ER techniques that help facilitate frequent buyer award point programs. In this regard, certain exemplary embodiments relate to electronic award points management techniques that in certain exemplary instances authenticate product purchases and determine eligibility for inclusion in a manufacturer's or a retailer's award program. Certain exemplary embodiments may provides techniques that help identify and detect potential fraudulent transactions, such as attempted registration of non-purchased items (products and/or points cards), registration of items where certain product identification information was obtained by copying serial numbers from product that is in a manufacturer's warehouse or in a retailer's store inventory, or by creating/counterfeiting serial numbers. Such techniques may apply to purchases of products that are uniquely identifiable through such means as, for example, an item's (product's and/or point cards') individual serial number, and/or the combination of a product's UPC (or EAN, JAN, or the like) and serial number, and/or EPC (Electronic Product Code/RFID), or any other method that uniquely identifies a specific item. Certain exemplary embodiments in addition or in the alternative may provide increased scrutiny even to items (products and/or point cards) that are unregistered.

In general, these exemplary techniques provide purchase authentication/verification techniques. Exemplary backed systems may have a modular structure, wherein one module contains sensitive and highly confidential customer information (which may be managed by the manufacturer and/or a retailer), whereas another module may be managed independently by a third party that validates/verifies product purchase information for one or many retailer(s) and/or manufacturers. The latter module may not store information pertaining to individuals.

Exemplary Validation/Verification Technique 1

In a first exemplary validation/verification technique, purchase information may be known and accessible via an ER. The improved ER system of certain exemplary embodiments may use information (such as, for example, serial number, shipment data from manufacturer to specific retailers, etc.) to realize the benefits associated with ER systems and to authenticate and verify an item's eligibility for award points. Illustrative electronic registration systems are disclosed in, for example, U.S. Pat. Nos. 5,978,774; 6,018,719; and 6,085,172, the entire contents of which are each incorporated herein by reference.

Figure 3:
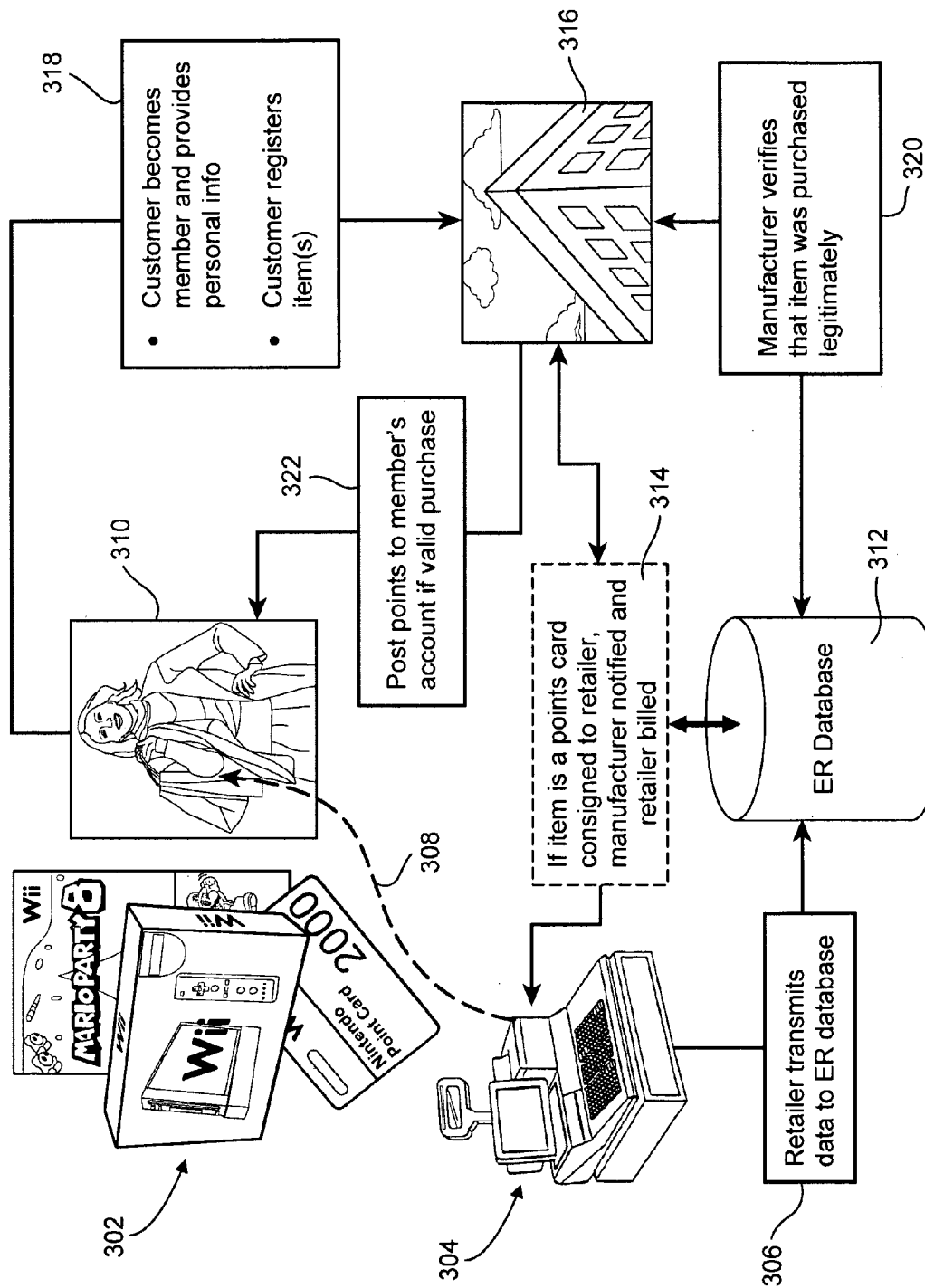
FIG. 3 is an overview of an illustrative process for purchasing and registering an item (product and/or points card) when purchase information is known, in accordance with an exemplary embodiment.

FIG. 3 is an overview of an illustrative process for purchasing and registering an item (product and/or points card) when purchase information is known, in accordance with an exemplary embodiment. A customer buys an item or items 302 (e.g., products and/or points cards) from a retail location or online location. During the transaction, the retailer 304 obtains information pertaining to the item, for example, by scanning a UPC (or EAN, JAN, or the like) and the serial number and appends date, time, store number, register number, and/or other data to the record. This information is then transmitted (306) to the ER database 312. The dashed line 308 shows the items being given to the customer 310. The ER database 312 receives, validates, and stores the data from the retailer 304. If the item being sold is a points card consigned free to a retailer 304 (until sale), the ER system may act as in independent broker and/or notify the manufacturer 316 of the sale such that the retailer 304 is billed, directly or indirectly, by the manufacturer, e.g., at a predetermined price or rate.

An individual may enroll in the rewards program either before or after a sale so as to become a member of that program and register the item (318). In certain exemplary instances, an individual may become a member by opting into the program at the time of the sale (e.g., by completing a short questionnaire, having information such as name and address gleaned from the sale and then submitting this information, by filling out an additional form, etc.). Membership enrollment options may be provided by, for example, an Internet website, and required membership information may include, for example, personal information, including email address, etc. One example awards points program is Club Nintendo, which can be accessed by visiting a website provided by the manufacturer.

After the sale or as a part of the transaction, product purchase information (including, for example, brand, UPC, model, serial numbers, date purchased, retailer's name where purchased, etc.) may be received from the individual or POS location and transmitted to the manufacturer. The manufacturer's system may transmit to the ER database the product purchase information (with or without personal information) for further processing (320). If a similar matching purchase record on the very same serial number is found in the ER database, the manufacturer is notified to allocate the appropriate point value or credits to the member's account (322).

When a sale is voided, the retailer may send a "void-sale" code to the ER database to cancel the previous sale and permit the card or product to be resold, if so desired.

Figure 4:
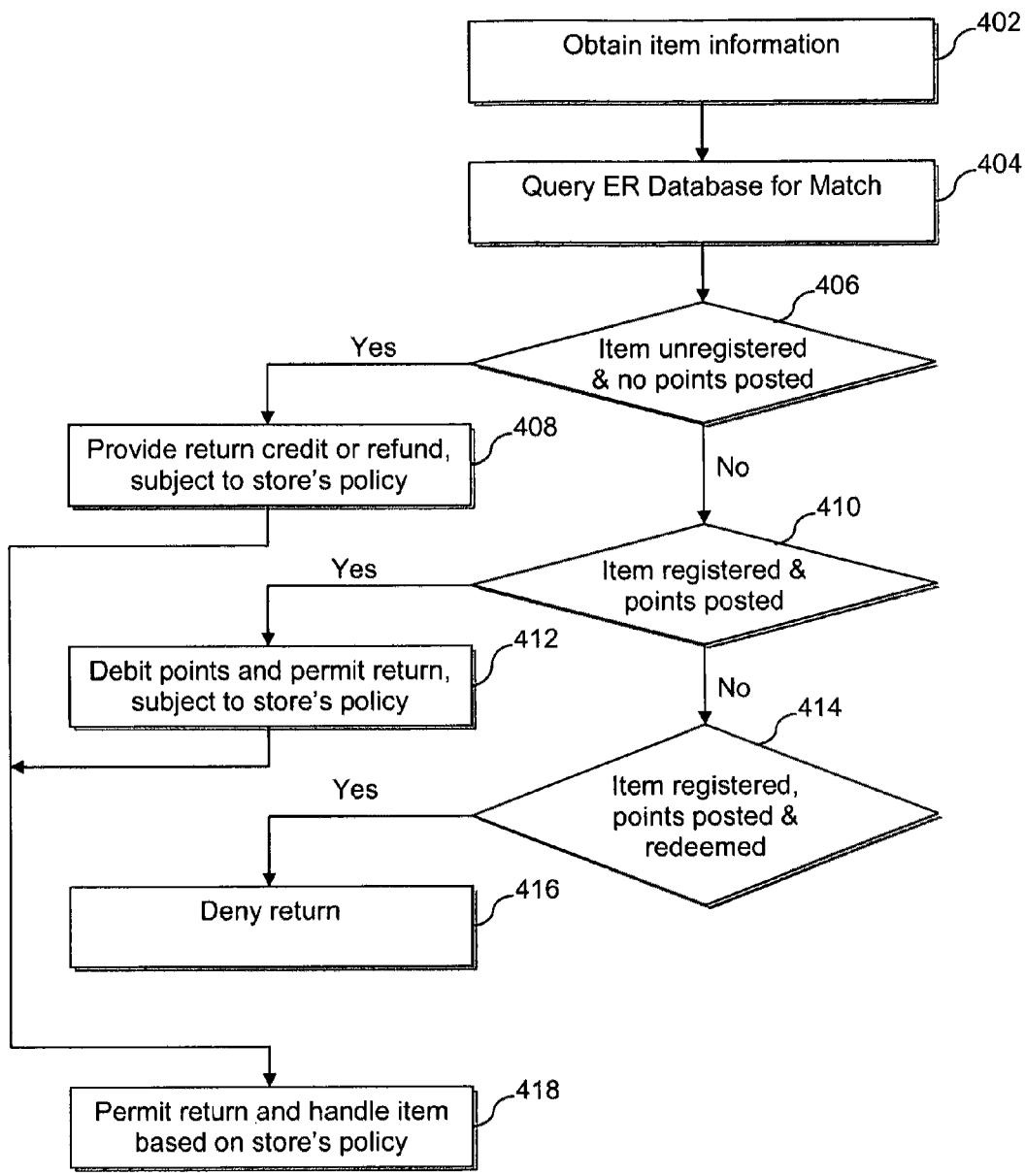
FIG. 4 is an illustrative flowchart showing a process for handling returns under different scenarios in accordance with an exemplary embodiment.

FIG. 4 is an illustrative flowchart showing a process for handling returns under different scenarios in accordance with an exemplary embodiment. Item information (e.g., UPC and serial number) is obtained, e.g., using a scanner, in step 402. In step 404, the ER database is queried to determine whether there is a matching item stored therein and, if so, whether the product was registered with the rewards system. This may involve interfacing with the manufacturer's reward system if information is not stored directly in the ER database itself. In any event, an assessment is made in step 406 as to whether the item is unregistered and no points have been posted to the member's account. If so, a return credit or refund is provided in step 408, subject to the store's policy. If not, an assessment is made in step 410 as to whether the item was registered and points were posted to the members account. If so, in step 412, the points are debited from the member's account and a return is permitted (which, as above, may be subject to the store's policy). However, an assessment is made in step 414 as to whether the item was registered, and whether the corresponding points were posted to the member's account and then redeemed. In such a case, the return is to be denied. In certain exemplary embodiments, the return may not be denied even if the points are redeemed, provided that the member's point balance is high enough to otherwise deduct a sufficient number of points.

If the answer to the determination in step 406 or step 410 is "yes," as indicated above, store returns are permitted subject to the store's policy in step 418. In certain example embodiments, the location's return/refund policy may be stored in or retrievable by the ER database. A return code may be generated and transmitted to the ER database, and the manufacturer may issue an appropriate credit to the retailer. In situations where a point card is being returned, the retailer may dispose/destroy the card (and an instruction to this effect may be delivered to the retailer), whereas other hard-good items may be returned to the manufacturer.

Exemplary Validation/Verification Technique 2

In a second exemplary validation/verification technique, techniques may be provided for instances where an item (product or points card) is purchased from a retailer and/or distributor that does not participate in electronic product registration and purchase information and/or shipment data therefore is not known. In other words, certain exemplary embodiments may have applicability to illustrative situations where products are identifiable to the unique item level (with such products being, for example, serialized game titles, serialized products, etc.) that where purchased from retailers that do not participate in an electronic product registration (and thus may be considered non-ER retailers) program and/or where no prior purchase information is available, and/or products that were purchased from ER retailers where registration failed (as the assignee of the instant invention has determined that a small percentage or about 0.43% of serial numbers result in error or fail).

Figure 5:
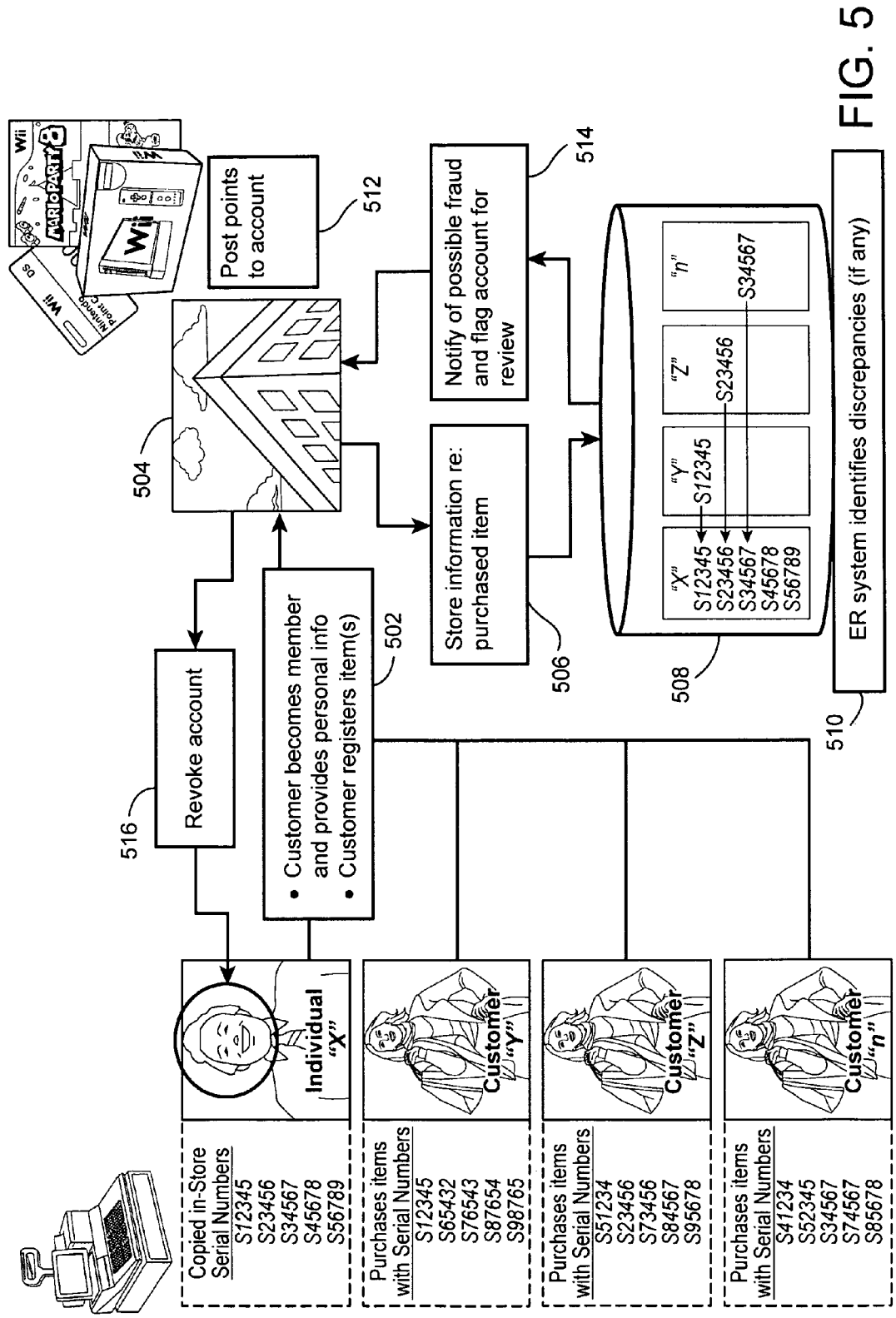
FIG. 5 is an overview of an illustrative process for purchasing and registering an item (product and/or points card) when purchase information is not known, in accordance with an exemplary embodiment.

FIG. 5 is an overview of an illustrative process for purchasing and registering an item (product and/or points card) when purchase information is not known, in accordance with an exemplary embodiment. It will be appreciated that the techniques described in connection with FIG. 5 may, for example, involve a third-party company that specializes in electronic registration. Of course, it will be appreciated that certain exemplary embodiments may accommodate one or more other manufacturers that may express interest in such a service, whether the one or more manufacturers are from a common industry (e.g., game developers) or multiple industries. Providing flexibility in this way may help reduce system management costs, while also improving efficiencies and service levels. It also may increase the ability to identify fraudsters that prey on multiple companies in one or more industries, thereby helping to build a common case against a fraudster. For instance, fraudsters targeting certain Nintendo products also may be likely to target related products and/or competitor products (e.g., Song, Microsoft, etc.).

In any event, similar to the illustrative process steps described above, customers may establish online accounts to become members of the awards program providing, for example, personal information such as name, contact details, email address, etc., and product purchase information (such as, for example, brand, UPC, model, serial number, date purchased, retailer's name where purchased from, etc.) may be provided (step 502). The manufacturer's system 504 transmits (step 506) to the ER system 508 the product purchase information or at least a portion thereof (with or without personal information) for further processing. The ER system 508 then attempts to identify whether there are any discrepancies (step 510). For example, if no other purchase record is found in the ER database, the manufacturer 504 may be notified accordingly and the appropriate point value credits may be allocated (step 512) to the member's account. It will be appreciated that if purchase information is present, then the first exemplary validation/verification technique described above in connection with FIG. 3 may be followed, for example.

If initially no product purchase information is found in the ER database, but later product purchase information on the very same serial number is obtained electronically by the ER system (e.g., from a retailer or another member of the rewards program), the ER system may compare the two product purchase information records to determine if the initial product purchase information logged by the member matches that transmitted by the retailer. If certain information (e.g., retailer name, and/or purchase date, etc.) does not match, the manufacturer may be notified and the account may flagged for review (step 514). A waiting period may be imposed before points may be redeemed, e.g., so as to allow for possible fraud detection before any points can be redeemed improperly. The waiting period may be any defined amount of time such as, for example, a week, two weeks, 30 days, 90 days, etc.

It sometimes is desirable for an ER system to track product information and not information about individual customers. Accordingly, in certain exemplary embodiments, the ER system may not store any personal customer information. Rather, in certain exemplary embodiments, the manufacturer may forward anonymous unique identifiers for new members. One example that may be used is a "HASH ID Number," which may be generated by applying a hash algorithm to a member's e-mail address (or other unique information) so that only the original forwarding party (e.g., the manufacturer) can decode this essentially encrypted data. The Hash-ID number may be used by the third party ER system as an account number or secondary account number to group all items purchased by a particular member.

Indeed, in certain illustrative implementations, because the ER system operated by the assignee of the instant invention services many manufacturers, these manufacturers may provide to the ER system the serial number (and/or other product information) once the item is registered and the points posted, along with the individual's HASH ID Number (derived from the member's email address and/or other information). For privacy concerns, the supplier need not necessarily share the actual email address with the ER system. Instead, the Hash-ID Number may be shared and linked with the individual if fraud is detected and an investigation ensues. It will be appreciated that fraudulent acts may be identified and traced across multiple suppliers and retailers in exemplary embodiments where a Hash ID Number is provided to the ER database. It will be appreciated that the hash algorithm may be unknown to the ER system and known only to manufacturer or rewards program system in different exemplary embodiments.

If a particular member "X" posts multiple product serial numbers (with no prior POS registration record in the ER database) and subsequently member "Y" posts some of the very same serial numbers, and at a later date different members "Z" and "n" also post some of the same serial numbers as member "X" but dissimilar serial numbers from one another, the system may suspect member "X" of having falsely obtained serial numbers without having made a purchase. Certain exemplary embodiments may flag and/or freeze member account "X" for further investigation (step 516). The scanning and flagging may be performed automatically (e.g., without direct operator instruction) periodically, upon each purchase or registration, etc., or upon a specific request by a retailer, manufacturer, law enforcement personnel, or other potentially interested party (e.g., when products are lost, stolen, patterns of suspected fraud appear to emerge, etc.). The ER system may alert the retailer that sold the item and alert the supplier or manufacturer of potential theft of information and/or fraud. Because the supplier likely will have the personal information from all registered customers or members, the retailer in cooperation with the supplier may be able to determine if the suspected fraudster is a store employee or some other individual. In addition, or in the alternative, the ER system, in cooperation with the manufacturer and/or retailer, may help identify at least the fraudulent account, which may be frozen, deactivated, or flagged so that an alarm may be raised when used (e.g., to redeem rewards) and therefore ensnare a would-be fraudster.

It will be appreciated that certain exemplary embodiments may accept a certain amount of fraud/losses (e.g., where duplicate points were issued and redeemed) as a cost of doing business. A maximum fraud level threshold, however, may be determined and set by lengthening or shortening the suggested waiting-period before points can be redeemed in certain exemplary embodiments.

Added security measures may be provided in connection with certain exemplary embodiments. For instance, an added security measures may be provided in the event a serial number is copied by an individual (and even a store employee) who then waits until the item with that serial number is sold and immediately goes online to activate it before the individual who purchased it has a chance to go online. To help protect against this situation, when an individual goes online to register the serial number to log or redeem points associated with the product and the serial number proves to be a duplicate (e.g., it already was redeemed and/or points previously were allocated), the ER system may prompt the registration module to request additional information, e.g., from the second customer attempting to redeem these credits. Such additional information may include, for example, information from the item receipt such as the exact purchase date, the register transaction number, etc. If the secondary user information matches the information obtained from the POS register (as checked, for example, via the ER database), the system may allow for "duplicate" points to posted to the second customer, whereas the original or first-time registrant may be flagged by the system for further investigation.

Accounts may, of course, be deactivated and/or revoked if an individual is found to be a fraudster and appropriate further (e.g., criminal or civil) action may be taken.

The exemplary embodiments described herein may result in any number of advantages over conventional techniques. For instance, certain exemplary embodiments may allow point information to be printed directly on a case where it is continually visible. This may, in turn, help increase enrollment by increasing visibility of the program, reducing the likelihood of insert cards being lost, etc. As another example, certain exemplary embodiments may help reduce the likelihood of fraudulent enrollment and/or registration, improper redemption of points, theft of award point cards, etc. Costs savings may be realized, for example, by enabling the distribution or consignment of points cards to retailers at no cost, reducing the amount of paper or other product inserts, removing the need for special "tamper-proof" packaging or secured areas, etc. As still another example, retailers may be able to display cards in highly visible areas (e.g., at a POS register, gaming area, children's clothing sections, etc.) in an unsecured store setting. Furthermore, cards may be made of no value until they are sold through an authorized retailer's POS register and registered (e.g., using a suitably configured ER system), and even program participation with unregistered points cards may be made to come under additional scrutiny in certain example instances. The ability to reduce loss and waste by reducing or eliminating the need for inserts, packaging, and/or special storage, is particularly advantageous, especially as point, registration, and/or redemption information may be provided "in plain sight" in certain exemplary implementations.

Although certain exemplary embodiments have been described in relation to items having points associated therewith and/or points cards themselves, it will be appreciated that the techniques described herein may be applied to, for example, gift cards, prepaid cards, and/or other items that have value stored thereon.

The ER database of certain exemplary embodiments may store only product-related information. That is, in certain exemplary embodiments, the ER database may not store information related to individuals purchasing, returning, exchanging, or otherwise dealing with products. For example, individual names, addresses, credit card information, etc., need not be maintained by the ER database itself in certain exemplary embodiments. Rather, this information may instead be maintained by the POS location's systems and/or other third-party systems. Having the ER database track products rather than people may be advantageous in certain instances, as consumer anonymity may be maintained.

Additionally, although certain exemplary embodiments have been described as relating to serial numbers and/or IMEI numbers, it will be appreciated that the techniques described herein may be applied to products identified in different ways, e.g., by EPC, RFID, EAN, JAN, etc.

Furthermore, although certain exemplary embodiments have been described in relation to products having serial numbers, the present invention is not so limited. For example, unserialized products may also take advantage of the techniques described herein by virtue of other unique and/or identifiable characteristics thereof. Furthermore, certain products are produced in such limited quantities that their mere existence may be self-authenticating and/or self-identifiable. Additionally, certain products are so tightly controlled that their appearance via other channels may indicate a potential problem worthy of notification to a trusted authority (e.g. the auction house, a manufacturer, a trusted ER intermediary, etc.).

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the scope of the appended claims.

What is claimed is:

1. A method of detecting potentially fraudulent transactions, the method comprising:

providing an electronic registration (ER) system having an ER database of entries for sold items, each said entry including a unique identifier of a corresponding sold item, and each said item having reward points associated therewith, the reward points being redeemable in connection with a rewards program administered at least in part by a rewards program system;

querying the ER database to locate a matching entry when an item is presented for return or refund at a location, using a processor of the ER system, and determining whether the item presented for return or refund has been registered with the rewards program system and whether reward points associated with the item presented for return or refund have been credited to a member and/or redeemed by the member when the item is presented for return or refund at the location, using the processor of the ER system;

sending a signal to the location authorizing the return or refund subject to any return/refund policies of the location when the item presented for return or refund has not been registered with the rewards program system and the reward points associated with the item presented for return or refund have not been credited to the member;

sending a signal to the location authorizing the return or refund subject to any return/refund policies of the location, and authorizing the debiting of a corresponding number of reward points from the member when the item presented for return or refund has been registered with the rewards program system and the reward points associated with the item presented for return or refund have been credited to the member; and sending a signal to the location denying the return or refund when the item presented for return or refund has been registered with the rewards program system, the reward points associated with the item presented for return or refund have been credited to the member, and the reward points have been redeemed.

2. The method of claim 1, wherein the item is one of either a rewards point card, or a physical product having an associated number of rewards points.

3. The method of claim 2, wherein each said entry in the ER database includes a serial number of the sold item, along with a date and time of the associated sale.

4. The method of claim 3, wherein each said entry in the ER database includes a return/refund policy associated with the item.

5. The method of claim 2, further comprising sending a message to a manufacturer of the item to prompt the manufacturer to issue a credit to the location upon successful return or refund.

6. The method of claim 2, further comprising instructing personnel at the location to dispose of or destroy the item upon successful return or refund of a rewards point card.

7. The method of claim 2, further comprising instructing personnel at the location to return the item to a manufacturer thereof upon successful return or refund of a physical product having an associated number of rewards points.

8. The method of claim 2, wherein the ER system is consulted prior to any reward points being credited to a member to determine whether the item being registered with the rewards program system has been properly sold.

9. The method of claim 8, further comprising when the ER system determines that an item being registered with the rewards program system has already been previously registered, causing the rewards program system to obtain additional information pertaining to the sale of the item being registered to determine whether the current registration is improper or whether the previous registration is improper.

10. The method of claim 9, wherein the additional information comprises information from a receipt of the sale of the item.

11. A method of detecting potentially fraudulent transactions, the method comprising:

providing an electronic registration (ER) system having an ER database of entries for sold items, each said entry including item information including at least a unique identifier of a corresponding sold item, and each said item having reward points associated therewith, the reward points being redeemable in connection with a rewards program administered at least in part by a rewards program system;

determining whether information for an item being registered with the rewards program system by a member of the rewards program exists in the ER database in cooperation with a processor of the ER system;

updating the ER database in cooperation with the processor of the ER system so as to include an entry for the item being registered and authorizing the rewards program system to award reward points associated with the item to the member registering the item, the entry including an anonymous member identifier, when the ER database does not include information for the item being registered; and examining item information entered by the member who previously registered the product and item information entered by the member attempting to register the product to identify a suspected fraudster when the ER database includes information for the item being registered, and sending the anonymous member identifier of the suspected fraudster to the rewards program system providing for potential follow-up by rewards program personnel when the ER database includes information for the item being registered.

12. The method of claim 11, wherein the item is one of either a rewards point card, or a physical product having an associated number of rewards points.

13. The method of claim 12, wherein the ER database includes entries for items from a plurality of manufacturers operating a plurality of rewards programs.

14. The method of claim 12, wherein the ER system is consulted via the rewards program system prior to any point redemption activities to determine whether a predetermined amount of time has elapsed since points have been credited to a member.

15. The method of claim 12, wherein the anonymous member identifiers stored in the ER database are generated by applying a hash algorithm to members' e-mail addresses such that the members' e-mail addresses are needed to decode the anonymous member identifiers.

16. An electronic registration (ER) system, comprising:
an ER database including a plurality of entries for sold items, each said entry including a unique identifier of a corresponding sold item, and each said item having reward points associated therewith, the reward points being redeemable in connection with a rewards program administered at least in part by a rewards program system; and
a processor configured to execute instructions for querying the ER database,
wherein the processor is configured to search the ER database when an item is presented for return or refund at a location to (a) locate a matching entry, and (b) determine whether the item presented for return or refund has been registered with the rewards program system and whether reward points associated with the item presented for return or refund have been credited to a member and/or redeemed by the member,
wherein the processor is further configured to generate and send a signal to the location authorizing the return or refund subject to any return/refund policies of the location when the item presented for return or refund has not been registered with the rewards program system and the reward points associated with the item presented for return or refund have not been credited to the member,
wherein the processor is further configured to generate and send a signal to the location authorizing the return or refund subject to any return/refund policies of the location when the item presented for return or refund has been registered with the rewards program system and the reward points associated with the item presented for return or refund have been credited to the member and further authorizing the debiting of a corresponding number of reward points from the member, and
wherein the processor is further configured to generate and send a signal to the location denying the return or refund when the item presented for return or refund has been registered with the rewards program system, the reward points associated with the item presented for return or refund have been credited to the member, and the reward points have been redeemed,
wherein the item is one of either a rewards point card, or a physical product having an associated number of rewards points.

17. The system of claim 16, wherein the processor is further configured to send a message to a manufacturer of the item to prompt the manufacturer to issue a credit to the location upon successful return or refund.

18. The system of claim 16, wherein the processor is further configured to generate and send a message to the location instructing personnel at the location to dispose of or destroy the item upon successful return or refund of a rewards point card and to return the item to a manufacturer thereof upon successful return or refund of a physical product having an associated number of rewards points.

19. The system of claim 16, wherein the ER system is consulted by the rewards program system to determine whether the item being registered with the rewards program system has been properly sold prior to any reward points being credited to a member.

20. The system of claim 19, wherein the ER system is further configured to cause the rewards program system to obtain additional information pertaining to the sale of the item being registered to determine whether the current registration is improper or whether the previous registration is improper when the ER system determines that an item being registered with the rewards program system has already been previously registered.

21. The system of claim 20, wherein the additional information comprises information from a receipt of the sale of the item.

22. An electronic registration (ER) system, comprising:
an ER database including entries for sold items, each said entry including item information including at least a unique identifier of a corresponding sold item, and each said item having reward points associated therewith, the reward points being redeemable in connection with a rewards program administered at least in part by a rewards program system; and
a processor configured to determine whether information for the item being registered exists in the ER database when an item is being registered with the rewards program system by a member of the rewards program,
wherein the ER database is updatable when the processor indicates that the ER database does not include information for the item being registered so as to include an entry for the item being registered and wherein the processor is configured to instruct the rewards program system to award reward points associated with the item to the member registering the item, the entry including an anonymous member identifier, and
wherein the processor is further configured to examine item information entered by the member who previously registered the product and item information entered by a member attempting to register the product to identify a suspected fraudster, and send the anonymous member identifier of the suspected fraudster to the rewards program system providing for potential follow-up by rewards program personnel,
wherein the item is one of either a rewards point card, or a physical product having an associated number of rewards points.

23. The system of claim 22, wherein the ER database includes entries for items from a plurality of manufacturers operating a plurality of rewards programs.

24. The system of claim 22, wherein the ER system is consulted via the rewards program system prior to any point redemption activities to determine whether a predetermined amount of time has elapsed since points have been credited to a member.

25. The system of claim 22, wherein the anonymous member identifiers stored in the ER database are generated by applying a hash algorithm to members' e-mail addresses such that the members' e-mail addresses are needed to decode the anonymous member identifiers.

* * * * *